US005676357A

United States Patent [19]

Horn

[11] Patent Number: 5,676,357

[45] Date of Patent: Oct. 14, 1997

[54] CLAMP INCLUDING RESILIENT INTERNAL LINK

[75] Inventor: Edward R. Horn, Oconomowoc, Wis.

[73] Assignee: Aladdin Engineering & Manufacturing, Inc., Waukesha, Wis.

[21] Appl. No.: 565,405

[22] Filed: Nov. 30, 1995

[51] Int. Cl.[6] .............................. B23Q 3/08; B23Q 5/033

[52] U.S. Cl. .............................. 269/32; 269/31; 269/228; 269/254 R; 269/201; 269/25

[58] Field of Search .............................. 269/32, 20, 31, 269/24, 59, 228, 229, 254 R, 254 CS

[56] References Cited

U.S. PATENT DOCUMENTS

| | | | |
|---|---|---|---|
| 1,018,380 | 2/1912 | Smith | 269/228 |
| 1,745,379 | 2/1930 | Perry | 269/254 CS |
| 2,439,483 | 4/1948 | Merriman | 144/290 |
| 2,815,052 | 12/1957 | Krasnow | 144/290 |
| 2,841,196 | 7/1958 | Zazdrazyk | 269/228 |
| 2,908,205 | 10/1959 | Furman et al. | 90/59 |
| 2,972,476 | 2/1961 | Blatt | 269/145 |
| 3,108,794 | 10/1963 | Blatt | 269/233 |
| 3,204,947 | 9/1965 | Sendoykas | 269/228 |
| 3,273,878 | 9/1966 | Blatt | 269/32 |
| 3,302,943 | 2/1967 | Mericle, Jr. | 269/32 |
| 3,362,703 | 1/1968 | Blatt | 269/233 |
| 3,371,923 | 3/1968 | Blatt | 269/32 |
| 3,371,953 | 3/1968 | Blatt | 294/88 |
| 3,381,954 | 5/1968 | Blatt | 269/32 |
| 3,482,830 | 12/1969 | Sendoykas | 269/32 |
| 3,482,831 | 12/1969 | Blatt | 269/32 |
| 3,545,050 | 12/1970 | Blatt et al. | 24/248 |
| 3,570,835 | 3/1971 | McPherson | 269/32 |
| 3,618,931 | 11/1971 | Blatt | 269/94 |
| 3,702,185 | 11/1972 | Blatt | 269/32 |
| 3,926,418 | 12/1975 | Blatt | 269/228 |
| 4,021,027 | 5/1977 | Blatt | 269/32 |
| 4,240,620 | 12/1980 | Tünkers | 269/24 |
| 4,449,745 | 5/1984 | Blatt | 294/88 |
| 4,469,318 | 9/1984 | Slavic | 269/254 CS |
| 4,576,367 | 3/1986 | Horn et al. | 269/32 |
| 4,596,415 | 6/1986 | Blatt | 294/88 |
| 4,679,782 | 7/1987 | Horn et al. | 269/228 |
| 5,072,652 | 12/1991 | Blatt | 92/85 R |

FOREIGN PATENT DOCUMENTS

| | | | |
|---|---|---|---|
| 927800 | 4/1955 | Germany | 269/254 CS |

OTHER PUBLICATIONS

DE–STA–CO Division, "The World of Clamping", pp. 1–75; published 1984.

*Primary Examiner*—Timothy V. Eley
*Assistant Examiner*—Lee Wilson
*Attorney, Agent, or Firm*—Michael, Best & Friedrich

[57] ABSTRACT

A pneumatically actuated clamp and gripped including a clamp arm supported for movement about a pivot, the clamp arm including a workpiece engaging portion spaced from the pivot and a driving member that is reciprocally moveable between a retracted position and a clamping position. The clamp further includes a link connected to the driving member and connected to the clamp arm in spaced relation from the pivot so that movement of the driving member from the retracted position toward the clamping position causes movement of the workpiece engaging portion of the clamp arm toward the workpiece, the link including a spring portion, the spring portion limiting the clamp force applied by the clamp arm to the workpiece.

3 Claims, 2 Drawing Sheets

CLAMP INCLUDING RESILIENT INTERNAL LINK

FIELD OF THE INVENTION

The invention relates to fluid operated clamping and gripping devices and more particularly to fluid operated clamps and grippers of the type for use in holding a workpiece in place during a manufacturing operation such as in a machining operation or in a welding operation and particularly fluid operated clamps and grippers that can be automatically controlled.

BACKGROUND PRIOR ART

A pneumatically actuated clamp for use in gripping a workpiece is shown in applicant's U.S. Pat. No. 4,679,782. In such devices a clamp arm has an end for engaging a workpiece and is supported for pivotal movement about a pivot pin by a frame. A pneumatically driven piston is operatively connected to the clamp arm through a linkage assembly to cause pivotal movement of the clamp arm between a clamping or gripping position and a retracted position. The workpieces being engaged by the clamp arm may be of different dimensions due to variations in tolerances in the workpiece, and it is important that the clamp assembly be capable of engaging workpieces of slightly different dimensions. In operation of a conventional clamp, the clamping arm is moved to a position where it begins to apply clamping force on a workpiece and then the clamp arm and driving links will move overcenter to a toggle position wherein the workpiece will be held even if the force of the pneumatic piston is released. As the link and clamp arm move past the toggle position, the stresses in the link and clamp arm can be extreme and can caused deformation of the pivot pins and the frame supporting the link and clamp arm. If the differences in the dimensions of the workpiece to be clamped are substantial due to tolerances in the workpieces, the stresses in the clamp during toggling of the clamp arm can cause substantial wear of the clamp components or bending of those components.

SUMMARY OF THE INVENTION

The invention includes a pneumatically actuated clamp and gripper including a clamp arm supported for movement about a pivot, the clamp arm including a workpiece engaging portion spaced from the pivot and a driving member that is reciprocally moveable between a retracted position and a clamping position. The clamp further includes a link connected to the driving member and connected to the clamp arm in spaced relation from the pivot so that movement of the driving member from the retracted position toward the clamping position causes movement of the workpiece engaging portion of the clamp arm toward the workpiece, the link including a spring portion, the spring portion limiting the clamping force applied by the clamp arm to the workpiece.

In a preferred embodiment of the invention the link comprises a generally C-shaped linkage pivotally connected at one end to the clamp arm and pivotally connected at an opposite end to the drive member, the C-shaped linkage being sufficiently flexible to function as a spring between the drive member and the clamp arm.

One of the features of the clamp embodying the invention is that the clamp mechanism includes an internal element which yields to prevent excessive stress in the components of the clamp and permits the clamp links to move to a toggle position even when the workpiece being clamped may be oversized and also permits unlocking of the clamp from the toggle condition.

Another feature of the invention is the provision of a clamp which provides substantially even clamping forces to workpieces of varying tolerances.

DESCRIPTION OF THE PREFERRED EMBODIMENT

Figure 1:
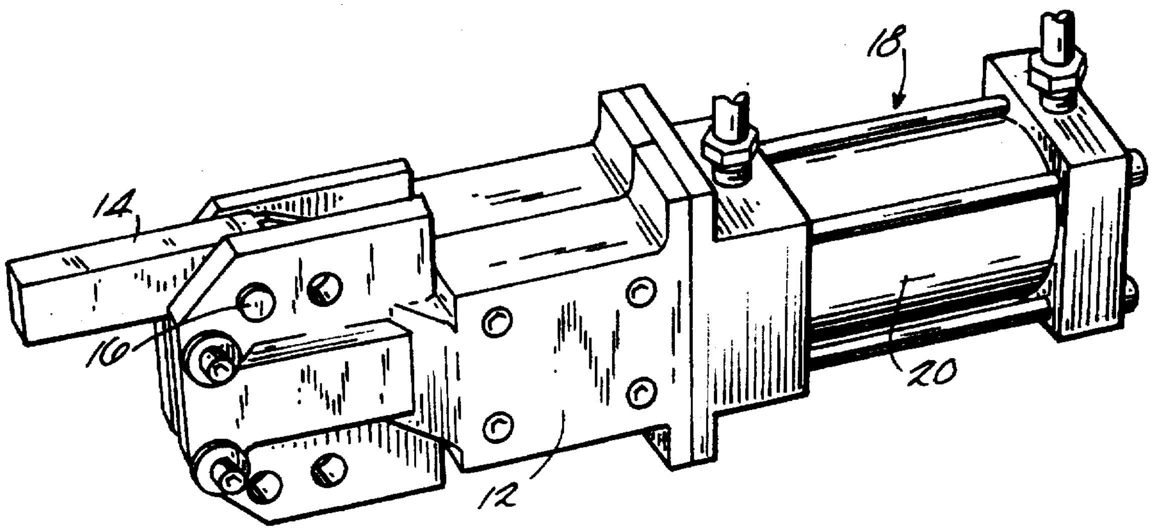
FIG. 1 is a perspective view of a pneumatic gripper embodying the invention.
Figure 2:
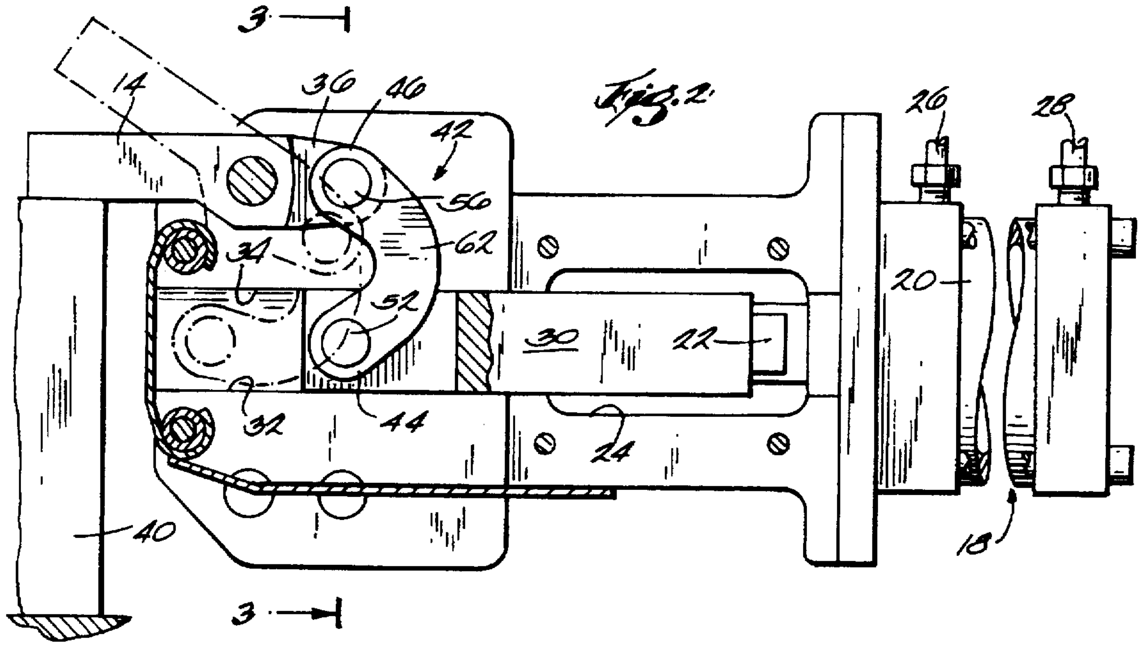
FIG. 2 is a side elevation view of the pneumatically actuated gripper shown in FIG. 1 with portions broken away.

Illustrated in FIG. 1 is a fluid actuated clamp 10 embodying the invention and including a frame 12 supporting a pivotable clamp arm 14 for reciprocating movement between a clamping position and a release or retracted position. As best shown in FIG. 2, the clamp arm 14 is supported for pivotal movement by a pivot pin 16 rigidly supported by the frame 12. The clamp 10 further includes a pneumatic piston and cylinder assembly 18 including a cylinder 20 fixed to an end of the frame 12 and a piston 22 (FIG. 2) moveable toward and away from the workpiece and between an extended position and a retracted position. In the illustrated arrangement the frame 12 includes a central cavity 24 housing the end of the piston 22. A pair of air pressure supply lines 26 and 28 are operably connected to opposite ends of the cylinder 20 to actuate the piston 22.

The clamp 10 further includes a driving member or yoke 30 supported by the frame 12 and fixed to the end of the piston 22 for reciprocating movement with the piston between a retracted position and an extended position. In the particular embodiment of the invention shown in the drawings, the yoke 30 is slideably supported by a pair of tracks or slide surfaces 32 and 34 provided in the central cavity of the frame and extending parallel to the direction of movement of the piston 22.

Means are also provided for operably connecting the yoke 30 to a rearward end 36 of the clamp arm 14 and in spaced relation from the pivot pin 16 such that reciprocating movement of the piston 22 and the yoke 30 causes clamping movement of the clamp arm 14 between the positions shown in solid lines in FIG. 2 wherein the clamp arm 14 clampingly engages the workpiece 40 and a retracted position shown in phantom. In the illustrated arrangement the means for connecting the yoke 30 to the rearward end of the clamp arm 14 includes a linkage assembly 42 having an end 44 pivotally connected to a forward end of the yoke 30 and an opposite end 46 pivotally connected to the rearwardly extending end 36 of the clamp arm 14.

Figure 3:
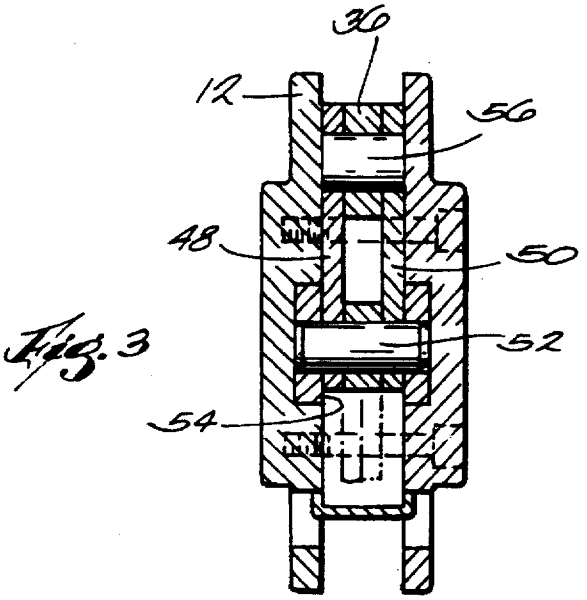
FIG. 3 is a cross-section view taken along line 3—3 in FIG. 2.

As best shown in FIGS. 2 and 3, the linkage assembly 42 is comprised of a pair of spaced apart links 48 and 50 pivotally joined to the yoke 30 by a pin 52 which extends through the forward end of the yoke 30. The forward end of the yoke 30 includes a central cavity or cleft 54 adapted to house ends 44 of the links 48 and 50. The opposite ends 46 of the spaced apart links 48 and 50 are pivotally joined to the rearward end 36 of the clamp arm 14 by a pivot pin 56 extending through the rearward end 30 of the clamp arm 14.

and such that the end 46 of the link 43 is pivotally supported on one end of the pin 56 and an end 46 of the link 50 is pivotally supported on opposite end of the pivot pin 56. The pivot pin 56 is spaced rearwardly of the pivot pin 16 connecting the clamp arm to the frame such that the rearward end 36 functions as a lever arm for causing pivotal movement of the clamp arm 14 about pivot pin 16.

In the specific embodiment of the invention shown in the drawings, the opposite sides of the rearward portion 36 of the clamp arm are milled such that the rearward portion 36 has a thickness which is sufficiently less than the thickness of the forward portion of the clamp arm that the combined thickness of the clamp arm and the links is approximately equal to the thickness of the forward end of the clamp arm.

In a preferred form of the invention each of the links 48 and 50 has a generally C-shaped configuration such that the central portion 62 of the links 48 and 50 will be bendable or resiliently compressible when a compression load or force is applied to the links 48 and 50 extending in the direction between their opposite ends, and the links will absorb any distortion in the component parts of the clamp caused by clamping of workpieces of different thicknesses and also permitting the slide member to move to a position wherein the clamp toggles or moves over center. In a preferred form of the invention the links can be comprised of any steel or other metal which is sufficiently resilient to accommodate compression of the opposite ends of the links.

While in the illustrated arrangement the linkage assembly is comprised of a pair of links 48 and 50, in other arrangements, the linkage assembly could be comprised of a single link member having a configuration as illustrated in FIGS. 2–3.

Figure 4:
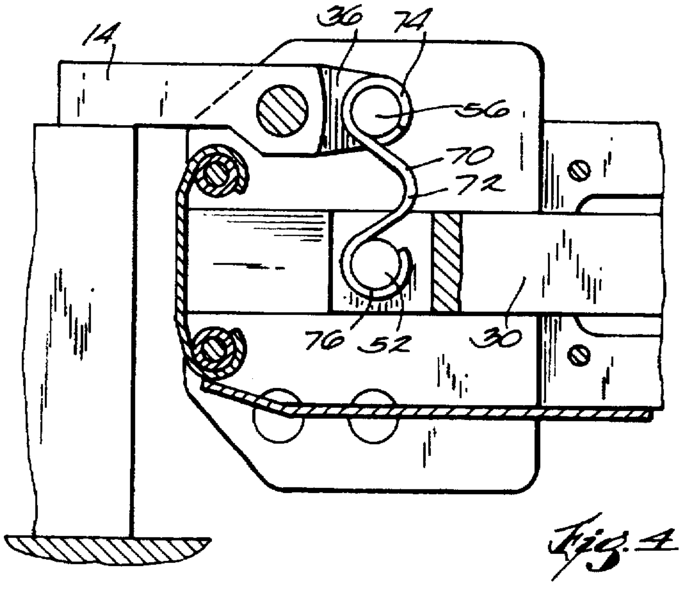
FIG. 4 is a partial view of an alternative embodiment of the invention.

Another alternative embodiment of the invention is shown in FIG. 4. In that embodiment, the linkage assembly is comprised of a wire spring 70 curved so as to include a resilient central portion 72 intended to accommodate compression of the opposite ends 74 and 76 of the linkage assembly toward one another. The opposite ends 74 and 76 of the wire spring 70 are wound around the pivot pins 56 and 52, respectively, so as to fixedly connect the wire spring 70 between the yoke 30 and the rearward end 36 of the clamp arm 14.

While in the illustrated arrangement the clamp is described as being pneumatically actuated in other embodiments the clamp could be hydraulically or mechanically driven or driven by a solenoid.

I claim:

1. A mechanical clamp for use in clampingly engaging a workpiece, said mechanical clamp comprising:

a clamp arm supported for movement about a pivot, said clamp arm including a workpiece engaging portion spaced from said pivot;

a driving member that is reciprocally moveable between a retracted position and a clamping position;

a link connected to said driving member and connected to said clamp arm in spaced relation from said pivot so that movement of said driving member from said retracted position toward said clamping position causes movement of said workpiece engaging portion of said clamp arm toward the workpiece; and said link including a spring portion between the driving member and the clamp arm, the spring portion limiting the clamping force applied by said clamp arm to the workpiece, wherein the link includes opposite ends and wherein the link includes a C-shaped central portion between the opposite ends and defining the spring portion.

2. A mechanical clamp for use in clampingly engaging a workpiece, the mechanical clamp comprising:

a clamp arm supported for movement about a pivot, said clamp arm including a workpiece engaging portion spaced from said pivot;

a driving member that is reciprocally moveable between a retracted position and a clamping position; and a link connected to said driving member and connected to said clamp arm in spaced relation from said pivot so that movement of said driving member from said retracted position toward said clamping position causes movement of said workpiece engaging portion of said clamp arm toward the workpiece, said link including a compressible resilient spring portion which limits the clamping force applied by said clamp arm to the workpiece, the link including opposite ends, one end connected to the clamp arm and the other end connected to the driving member and wherein the spring portion of the link is an intermediate portion of the link curved about an axis perpendicular to the direction between the opposite ends of the link, wherein the link includes a C-shaped central portion between the opposite ends and defining the spring portion.

3. A mechanical clamp for use in clampingly engaging a workpiece, said mechanical clamp comprising:

a base, a clamp arm supported by said base for movement about a pivot, said clamp arm including a workpiece engaging portion spaced from said pivot;

a driving member that is reciprocally moveable between a retracted position and a clamping position;

a spring connected to said driving member and connected to said clamp arm in spaced relation from said pivot such that movement of said driving member from said retracted position toward said clamping position causes movement of said workpiece engaging portion of said clamp arm toward the workpiece.

* * * * *